US006927006B2

(12) United States Patent
Finn et al.

(10) Patent No.: US 6,927,006 B2
(45) Date of Patent: Aug. 9, 2005

(54) FUSER MEMBER HAVING FLUOROCARBON OUTER LAYER

(75) Inventors: Patrick J. Finn, Webster, NY (US); Robert S. Pawlik, Webster, NY (US); Elizabeth L. Barrese, Rochester, NY (US); David J. Gervasi, West Henrietta, NY (US); Pat Goode, Macedon, NY (US); Santokh S. Badesha, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 133 days.

(21) Appl. No.: 10/446,909

(22) Filed: May 28, 2003

(65) Prior Publication Data

US 2003/0207078 A1 Nov. 6, 2003

Related U.S. Application Data

(63) Continuation-in-part of application No. 09/948,522, filed on Sep. 7, 2001, now Pat. No. 6,733,943.

(51) Int. Cl.$^{7}$ .......................... G03G 13/20; B32B 27/06

(52) U.S. Cl. .................... 430/124; 399/333; 428/473.5; 428/474.7; 428/421; 428/422

(58) Field of Search .......................... 430/124; 399/333; 428/473.5, 474.7, 421, 422

(56) References Cited

U.S. PATENT DOCUMENTS 4,411,977 A 10/1983 Tarumi et al. .............. 430/126
5,035,950 A 7/1991 Del Rosario ................ 428/421
5,343,280 A 8/1994 Hirabayashi et al. ....... 355/285
5,532,056 A 7/1996 Satoh et al. ................ 428/332
5,641,568 A 6/1997 Satoh et al. ................ 428/332
5,709,949 A 1/1998 Chen et al. ................. 428/421
5,759,655 A 6/1998 Kitajima et al. ......... 428/36.91
5,763,129 A 6/1998 Chen et al. ................... 430/99
5,853,892 A 12/1998 Chen et al. ................. 428/421
5,855,977 A 1/1999 Fukushi et al. ............ 428/36.6
5,900,295 A 5/1999 Kawada ..................... 428/36.9
5,906,881 A 5/1999 Chen et al. ................. 428/141
5,948,491 A 9/1999 Chen et al. ................ 428/35.7
5,968,300 A 10/1999 Shimura et al. ............ 156/190
6,001,440 A 12/1999 Miyamoto et al. ......... 428/38.9
6,007,918 A 12/1999 Tan et al. ................... 428/451
6,010,791 A 1/2000 Tan et al. ................... 428/451
6,066,400 A 5/2000 Law et al. .................. 428/412
6,074,574 A 6/2000 Chen et al. ............ 252/183.11
6,074,719 A 6/2000 Fukushi et al. ............ 428/36.9
6,096,427 A 8/2000 Chen et al. ................. 428/412
6,217,963 B1 4/2001 Miyamoto et al. ....... 428/36.91
6,821,626 B1 * 11/2004 Davis et al. ................ 428/421

OTHER PUBLICATIONS

Whitford Worldwide, Introduction to Xylan Formulations, Engineering Design Guide for High–Performance Fluoropolymer Coatings, Apr. 1992, p. 7.

* cited by examiner

*Primary Examiner*—Mark A. Chapman
(74) *Attorney, Agent, or Firm*—Annette L Bade

(57) ABSTRACT

A fuser member having a polyimide substrate, and thereover, an outer layer with from about 61 to about 99 volume percent fluorocarbon.

19 Claims, 4 Drawing Sheets

FUSER MEMBER HAVING FLUOROCARBON OUTER LAYER

This application is a continuation-in-part of U.S. application Ser. No. 09/948,522, filed Sep. 7, 2001, U.S. Pat. No. 6,733,943, issued May 11, 2004, the disclosure of which is totally incorporated by reference.

Attention is directed to U.S. Pat. No. 6,829,466, issued Dec. 7, 2004, entitled, "Fuser Member having High Temperature Plastic Outer Layer;" and U.S. Pat. No. 6,733,943, issued May 11, 2004, entitled, "Fuser Member having Polyimide Outer Layer." The disclosures of each of these are hereby incorporated by reference in their entirety.

BACKGROUND OF THE INVENTION

The present invention relates generally to an imaging apparatus and fuser components thereof for use in electrostatographic, including digital, apparatuses. The fuser components, including fuser members, pressure members, donor members, external heat member, and the like, are useful for many purposes including fixing a toner image to a copy substrate. More specifically, the present invention relates to fuser components comprising a fluorocarbon outer layer. In embodiments, the fluorocarbon outer layer is positioned on a substrate, which may be of many configurations including a roller, belt, film, or like substrate. In other embodiments, the fluorocarbon outer layer has an outer release layer thereon. In embodiments, there is positioned between the substrate and the outer fluorocarbon layer, an intermediate and/or adhesive layer. In embodiments, the fuser member is a pressure member, such as a fuser member. The present invention may be useful as fuser members in xerographic machines, including color machines.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface, which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

Another important method for reducing offset, is to impart antistatic and/or field assisted toner transfer properties to the fuser. However, to control the electrical conductivity of the release layer, the conformability and low surface energy properties of the release layer are often affected.

U.S. Pat. No. 5,411,779 to Nakajima et al. discloses a composite tubular article for a fusing belt comprising a tubular inner layer of polyimide and fluoroplastic outer layers.

U.S. Pat. No. 5,309,210 to Yamamoto discloses a belt apparatus comprising a base layer polyimide and a fluorine resin outer layer.

U.S. Pat. Nos. 5,149,941 to Hirabayashi and U.S. Pat. No. 5,196,675 to Suzuki, both disclose an image fixing apparatus comprising an electrically insulating material base layer and low resistance surface layer insulating member comprised of a polyimide.

U.S. Pat. No. 5,532,056 teaches a fixing belt comprised of a polyimide resin.

U.S. Pat. No. 6,066,400 discloses biasable components comprising polyimides.

U.S. Pat. No. 5,761,595 discloses intermediate transfer components having a polyimide substrate and a fluorinated carbon filled fluoropolymer layer.

U.S. Pat. No. 6,201,945 discloses polyimide fuser components having doped metal oxides dispersed therein.

U.S. Pat. No. 6,397,034 discloses a fluorinated carbon filled polyimide intermediate transfer component.

Known fuser coatings include high temperature polymers such as polytetrafluoroethylene, perfluoroalkoxy, fluorinated ethylene propylene, silicone rubber, fluorosilicone rubber, fluoroelastomers, and the like. These coatings have been found to have adequate release properties and control toner offset sufficiently. However, these coatings do not tend to stay clean during use. Further, the coatings do not maintain a uniform surface. More specifically, the coatings often wear during use and/or become scratched during operation. In addition, these known surfaces often react with the toner and/or oil and/or debris from media, which causes the surface to become dirty and/or contaminated. The surface can, in turn, become physically damaged. The result of these problems is that the fuser member has a reduced useful function and short life. Another problem resulting from release coatings with high friction is unacceptable copy or print quality defects. The high friction often associated with conformable coatings may result in the generation of waves in the media being fused and/or the fuser member itself. This, in turn, results in copies or prints with localized areas of poorer fix and/or differential gloss.

Some of the above problems have been solved by recent improvements of adding polymer fillers to outer layers. However, the use of polymer fillers has caused other problems such as stripper finger marks present on copies, which leads to failure mode. Other failure modes include an offset failure mode problem. Further, wave defects have resulted.

Therefore, a need remains for fuser components for use in electrostatographic machines that have superior mechanical properties, including the ability to remain clean and uniform during use. A further need remains for fuser coatings having reduced susceptibility to contamination, scratching, and other damage. In addition, a need remains for fuser components having longer life. In addition, a need remains for fuser components with low friction while being resistant to scratching and other damage. Further, although some of the above problems have been solved by the use of improved coatings with polymer fillers, there still remains a need to reduce or eliminate stripper finger failure and offset failure modes, and wave defects.

SUMMARY OF THE INVENTION

The present invention provides, in embodiments, a fuser member comprising a polyimide substrate, and thereover, an outer layer comprising from about 61 to about 99 volume percent fluorocarbon.

The present invention further includes, in embodiments, a fuser member comprising a polyimide substrate, and thereover, an outer layer comprising from about 1 to about 39 volume percent polyimide and from about 61 to about 99 volume percent perfluoroalkoxy.

Embodiments further include an image forming apparatus for forming images on a recording medium comprising a charge-retentive surface to receive an electrostatic latent image thereon; a development component to apply toner to the charge-retentive surface to develop an electrostatic latent image to form a developed image on the charge retentive surface; a transfer film component to transfer the developed image from the charge retentive surface to a copy substrate; and a fuser member and fuser member for fusing toner images to a surface of the copy substrate, wherein the fuser member comprises a polyimide substrate, and thereover, an outer layer comprising from about 61 to about 99 volume percent fluorocarbon.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

Figure 1:
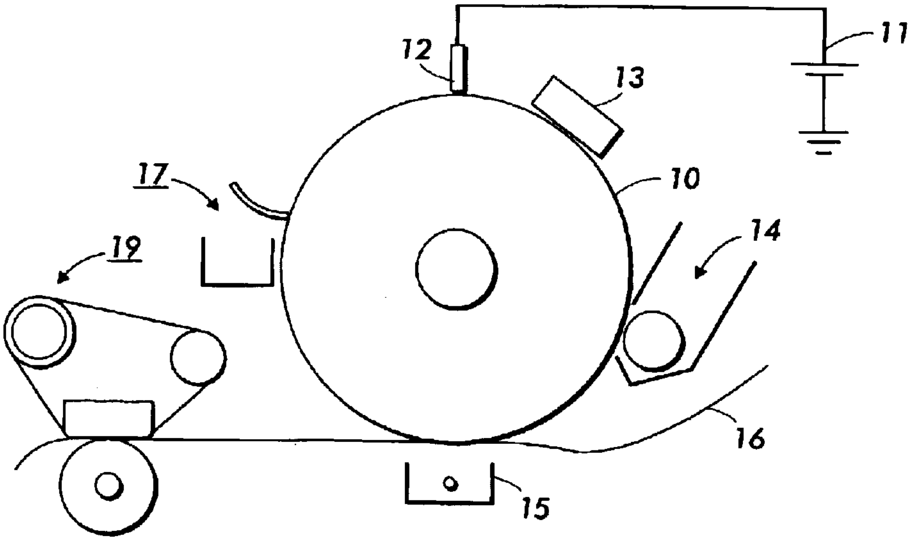
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing and pressure members, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
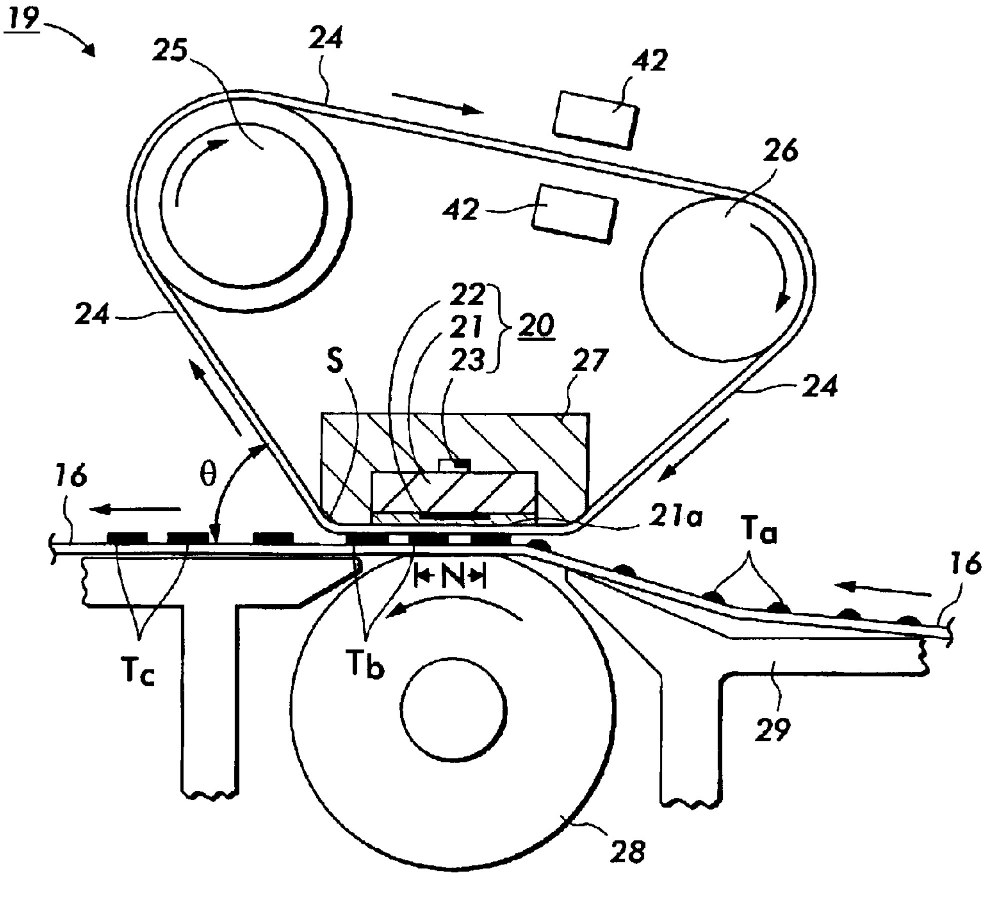
FIG. 2 is a sectional view of a fusing belt in accordance with one embodiment of the present invention.

FIG. 2 shows a sectional view of an example of a fusing apparatus 19 according to an embodiment of the present invention. In FIG. 2, a heat resistive film or an image fixing film 24 in the form of an endless belt is trained or contained around three parallel members, that is, a driving roller 25, a follower roller 26 of metal and a low thermal capacity linear heater 20 disposed between the driving roller 25 and the follower roller 26.

The follower roller 26 also functions as a tension roller for the fixing film 24. The fixing film rotates at a predetermined peripheral speed in the clockwise direction by the clockwise rotation of the driving roller 25. The peripheral speed is the same as the conveying speed of the sheet having an image thereon so that the film is not creased, skewed or delayed.

A pressing roller 28 has a rubber elastic layer with parting properties, such as silicone rubber or the like, and is press-contacted to the heater 20 with the bottom travel of the fixing film 24 therebetween. The pressing roller is pressed against the heater at the total pressure of 4–7 kg by an urging means (not shown). The pressure roller rotates co-directionally, that is, in the counterclockwise direction, with the fixing film 24.

The heater 20 is in the form of a low thermal capacity linear heater extending in a direction crossing with the film 24 surface movement direction (film width direction). It comprises a heater base 27 having a high thermal conductivity, a heat generating resistor 22 generating heat upon electric power supply thereto, and a temperature sensor 23, and is mounted on a heater support 21 having high thermal conductivity. The heater support 21 supports the heater 20 with thermal insulation on an image fixing apparatus and is made from high heat durability resin such as PPS (polyphenylene sulfide), PAI (polyamideimide), PI (polyimide), polyaramide, polyphthalamide, polyketones, PEEK (polyether ether ketone) or liquid crystal polymer material, or a compound material of such resin material and ceramics, metal, glass or the like material.

An example of the heater base 27 is in the form of an alumina plate having a thickness of 1.0 mm, a width of 10 mm and a length of 240 mm comprised of a high conductivity ceramic material.

The heat generating resistor material 22 is applied by screen printing or the like along a longitudinal line substantially at the center, of the bottom surface of the base 27. The heat generating material 22 is, for example, Ag/Pd (silver palladium), $Ta_2N$ or another electric resistor material having a thickness of approximately 10 microns and a width of 1–3 mm. It is coated with a heat resistive glass 21*a* in the thickness of approximately 10 microns, as a surface protective layer. A temperature sensor 23 is applied by screen printing or the like substantially at a center of a top surface of the base 27 (the side opposite from the side having the heat generating material 22). The sensor is made of Pt film having low thermal capacity. Another example of the temperature sensor is a low thermal capacity thermistor contacted to the base 27.

The linear or strip heater 22 is connected with the power source at the longitudinal opposite ends, so that the heat is generated uniformly along the heater. The power source in this example provides AC 100 V, and the phase angle of the supplied electric power is controlled by a control circuit (not shown) in accordance with the temperature detected by the temperature detecting element 23.

A film position sensor 42 in the form of a photocoupler is disposed adjacent to a lateral end of the film 24. In response to the output of the sensor, the roller 26 is displaced by a driving means in the form of a solenoid (not shown), so as to maintain the film position within a predetermined lateral range.

Upon an image formation start signal, an unfixed toner image is formed on a recording material at the image forming station. The copy sheet 16 having an unfixed toner image Ta thereon is guided by a guide 29 to enter between the fixing film 24 and the pressing roller 28 at the nip N (fixing nip) provided by the heater 20 and the pressing roller 28. Copy sheet 16 passes through the nip between the heater 20 and the pressing roller 28 together with the fixing film 24 without surface deviation, crease or lateral shifting while the toner image carrying surface is in contact with the bottom surface with the fixing film 24 moving at the same speed as copy sheet 16. The heater 20 is supplied with electric power at a predetermined timing after generation of the image formation start signal so that the toner image is heated at the nip so as to be softened and fused into a softened or fused image Tb.

Fixing film 24 is sharply bent at an angle theta of, for example, about 45 degrees at an edge S (the radius of curvature is approximately 2 mm), that is, the edge having a large curvature in the heater support 21. Therefore, the sheet advanced together with the film 24 in the nip is separated by the curvature from the fixing film 24 at edge S. Copy sheet 16 is then discharged to the sheet discharging tray. By the time copy sheet 16 is discharged, the toner has sufficiently cooled and solidified and therefore is completely fixed (toner image Tc).

In this embodiment, heat generating element 22 and base 27 of heater 20 have low thermal capacity. In addition, heater element 22 is supported on support 21 through thermal insulation. The surface temperature of heater 20 in the nip quickly reaches a sufficiently high temperature, which is necessary in order to fuser, the toner. Also, a stand-by temperature control is used to increase the temperature of the heater 20 to a predetermined level. Therefore, power consumption can be reduced, and rise in temperature can be prevented.

The fixing film is in contact with the heater. The distance between the outer layer of the fixing film and the heater is preferably from about 0.5 mm to about 5.0 mm. Similarly, the distance between the fixing film and the grounded rollers 25 and 26 is not less than about 5 mm and is, for example, from about 5 to about 25 mm. These distances prevent leakage of the charge applied to the copy sheet 16 by an image (not shown) forming station from leaking to the ground through the copy sheet 16. Therefore, possible deterioration of image quality due to improper image transfer can be avoided, or minimized.

In another embodiment of the invention, the fixing film may be in the form of a sheet. For example, a non-endless film may be rolled on a supply shaft and taken out to be wrapped on a take-up shaft through the nip between the heater and the pressing roller. Thus, the film may be fed from the supply shaft to the take-up shaft at the speed, which is equal to the speed of the transfer material, reference U.S. Pat. No. 5,157,446, the disclosure of which is hereby incorporated by reference in its entirety.

Figure 3:
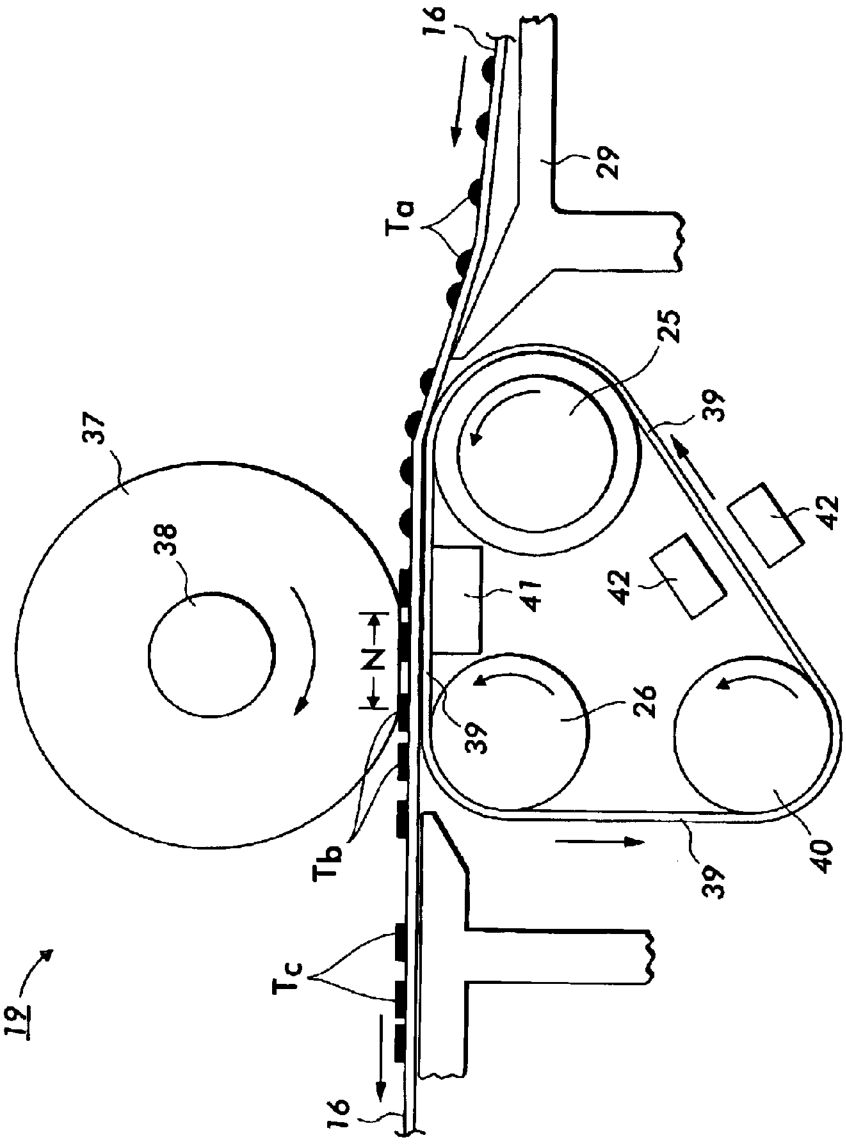
FIG. 3 is a sectional view of a pressure belt in accordance with one embodiment of the present invention.

Another embodiment is depicted in FIG. 3, wherein the fuser member is in the form of a fuser roller 37 having internal heater 38 positioned inside the fuser member. In an optional embodiment, the heating member 38 can be positioned on the outside of the fusing member. Pressure belt 39 cycles around rollers 25, 26, and 40. In this alternative configuration, the toner or other marking material is fused to the copy substrate 16 by fusing roller 37. The load on pad 41 is approximately 1.7 kgf. The fluorocarbon outer layer can be positioned on the fuser member and/or on the pressure belt. In a specific embodiment, the fluorocarbon outer layer is positioned on the pressure belt.

Figure 4:
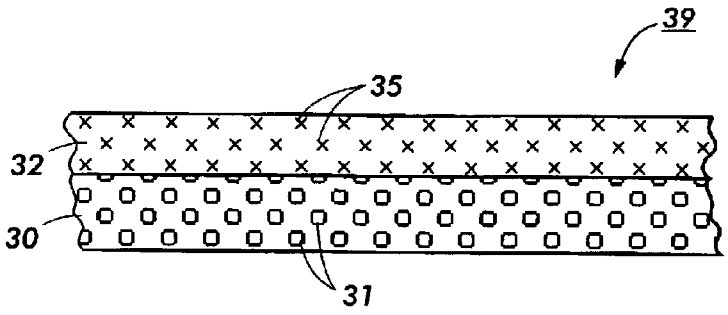
FIG. 4 is a schematic illustration of an embodiment of the present invention, and represents a fuser component having a two-layer configuration.

The fusing component of the present invention can be comprised of at least three different configurations. In one embodiment of the invention, the fusing component is of a two-layer configuration as shown in FIG. 4. FIG. 4 demonstrates fusing component as pressure belt 39. However, it is understood that this and other configurations herein, can be used on any fusing member. Pressure belt 39 comprises substrate 30 having optional fillers 31 dispersed or contained therein. Positioned over the substrate is outer fluorocarbon layer 32 having optional fillers 35 dispersed or contained therein.

Figure 5:
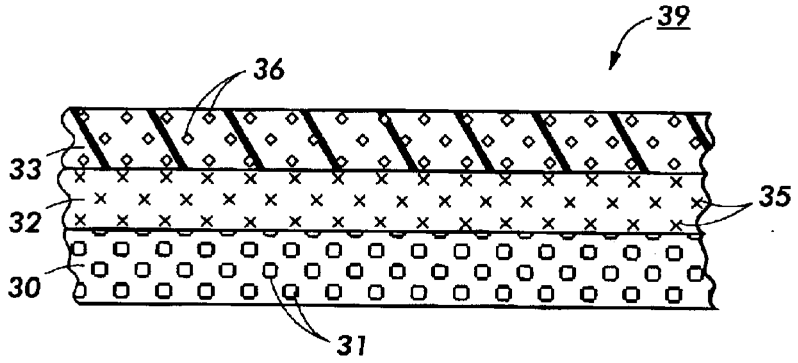
FIG. 5 is an illustration of an embodiment of the present invention, and represents a fuser component having a three-layer configuration, wherein the fluorocarbon layer is the intermediate layer.

FIG. 5 demonstrates an alternative embodiment of the pressure belt 39, which is that of a three layer configuration. FIG. 5 demonstrates substrate 30 having optional fillers 31 dispersed or contained therein. Positioned on the substrate 30 is outer fluorocarbon layer 32 having optional fillers 35 dispersed or contained therein. Positioned over the outer fluorocarbon layer 32 is outer release layer 33 having optional fillers 36 dispersed or contained therein.

Figure 6:
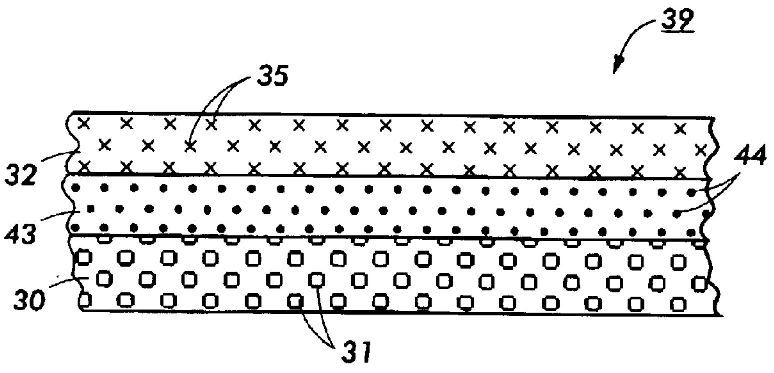
FIG. 6 is an illustration of an embodiment of the present invention, and represents a fuser belt having a three-layer configuration, wherein the fluorocarbon layer is the outermost layer.

An adhesive layer, or other intermediate layer or layers may be present between the substrate and the fluorocarbon outer layer and/or between the fluorocarbon outer layer and the outermost release layer. An example of this embodiment is set forth in FIG. 6, wherein substrate 30 is shown having optional intermediate or adhesive layer 43 thereon. Optional intermediate or adhesive layer 43 may have fillers 44 present therein. Positioned on optional layer 43 is fluorocarbon outer layer 32.

Fillers 31, 35, 36 and 44 are optional, and if present, may be the same or different.

Examples of suitable substrate materials include in the case of roller or film-type substrates, metals such as aluminum, stainless steel, steel, nickel and the like. In the case of film-type substrates, suitable substrates include high temperature plastics that are suitable for allowing a high operating temperature (i.e., greater than about 80° C., preferably greater than 200° C.), and capable of exhibiting high mechanical strength. In embodiments, the plastic has a flexural strength of from about 2,000,000 to about 3,000,000 psi, and a flexural modulus of from about 25,000 to about 55,000 psi. Plastics possessing the above characteristics and which are suitable for use as the substrate for the fuser members include epoxy; polyphenylene sulfide such as that sold under the tradenames FORTRON® available from Hoechst Celanese, RYTON R-4® available from Phillips Petroleum, and SUPEC® available from General Electric; polyimides such as polyamideimide sold under the tradename TORLON® 7130 available from Amoco; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco; polyethers such as polyethersulfone, polyetherimide, polyaryletherketone, and the like; polyparabanic acid; and the like; liquid crystalline resin (XYDAR®) available from Amoco; ULTEM® available from General Electric; ULTRAPEK® available from BASF; and the like, and mixtures thereof. Other suitable substrate materials include fluoroelastomers such as those sold under the tradename VITON® from DuPont; silicone rubbers, and other elastomeric materials. The substrate may also comprise a mixtures of any of the above materials.

The substrate as a film, sheet, belt, or the like, has a thickness of from about 25 to about 250, or from about 60 to about 100 micrometers.

In embodiments, a polyimide or polyamide filler is used in combination with the fluorocarbon outer layer.

The polyimide or polyamide is suitable for allowing a high operating temperature (i.e., greater than about 80, preferably greater than about 200° C. and more specifically, from about 150 to about 250° C.), capable of exhibiting high mechanical strength and optionally possessing tailored electrical properties.

The polyimide or polyamide can be any suitable high durability polyimide or polyamide capable of becoming a conductive film upon the addition of electrically conductive particles. The polyimide or polyamide has the advantages of chemical stability to liquid developer or toner additives, thermal stability for transfix applications and for improved overcoating manufacturing, improved solvent resistance as compared to known materials used for film for transfer components, and improved electrical properties including a uniform resistivity within the desired range.

Suitable polyimides include those formed from various diamines and dianhydrides, such as polyamideimide (for example, Amaco AI-10® from BP Amoco Polymers Inc., Alpharetta, Ga.); polyetherimide; siloxane polyetherimide block copolymer such as, for example, SILTEM® STM-1300 available from General Electric, Pittsfield, Mass.; and the like. Other examples of polyimides include aromatic polyimides such as those formed by the reacting pyromellitic acid and diaminodiphenylether sold under the tradename KAPTON®-type-HN available from DuPont. Another suitable polyimide available from DuPont and sold as KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy) phenoxy]-hexafluoropropane available as EYMYD type L-20N from Ethyl Corporation, Baton Rouge, La. Other suitable aromatic polyimides include those containing 1,2,1',2'-biphenyltetracarboximide and paraphenylene groups such as UPILEX®-S available from Uniglobe Kisco, Inc., White Planes, N.Y., and those having biphenyltetracarboximide functionality with diphenylether end spacer characterizations such as UPILEX®-R also available from Uniglobe Kisco, Inc. Mixtures of polyimides can also be used.

Suitable polyamides include polyphthalamide sold under the tradename AMODEL® available from Amoco.

Examples of suitable fluorocarbons include fluorocarbon monomers and polymers such as polytetrafluoroethylene (PTFE), fluorinated ethylenepropylene copolymer (FEP), polyfluoroalkoxy (PFA), perfluoroalkoxy polytetrafluoroethylene (PFA TEFLON®), ethylene chlorotrifluoro ethylene (ECTFE), ethylene tetrafluoroethylene (ETFE), polytetrafluoroethylene perfluoromethylvinylether copolymer (MFA), and the like, and mixtures thereof, and polymers thereof; and fluorocarbon fillers such as PTFE powder, FEP powder, PFA powder, PFA TEFLON® powder, ECTFE powder, ETFE powder, MFA powder, and mixtures thereof.

The polyimide or polyamide is present in the fusing component outer layer in an amount of from about 1 to about 39, or from about 5 to about 30, or from about 9 to about 20 volume percent of total solids. Volume percent as used herein includes the total volume percentage of solids including polymers, conductive fillers, low surface energy fillers, wear resistant fillers, colorant fillers, and any additives in the layer.

The fluorocarbon is present in the outer layer in amounts of from about 61 to about 99, or from about 70 to about 95, or from about 80 to about 91 volume percent of total solids.

A low surface energy filler and/or electrically conductive filler and/or chemically reactive filler may be present in the fluorocarbon outer layer. A low surface energy filler and/or electrically conductive filler may also be present in the substrate and/or adhesive or intermediate layer. Similarly, a low surface energy filler and/or electrically conductive filler may be present in the outer release layer. The filler if present in the outermost layer may aid in release by reacting with any functional groups in any release agent present. The electrically conductive filler may aid in controlling the charge on the fuser member to enhance performance such as non-visual offset or pre-nip toner disturbances or to enable use as a transfix or transfuse member.

Examples of suitable fillers include carbon fillers, metals, metal oxides, doped metal oxides, ceramics, polymer fillers, and the like, and mixtures thereof. Nanofillers are also suitable for use herein, including those having particle sizes of from about from 5 to about 350 nanometers, or from about 20 to about 100 nanometers. Examples of suitable carbon fillers include carbon black (for example, N330® from Cabot, Alpharetta, Ga.) graphite, fluorinated carbon black (for example, ACCUFLUOR® or CARBOFLUOR®), and the like, and mixtures thereof. Examples of metal fillers include aluminum, copper, silver, and the like, and mixtures thereof. Examples of suitable inorganics/ceramics include silicon carbide, silicone nitride, boron nitride, aluminum nitride, boron carbide, tungsten carbide, barium sulfate, and the like, and mixtures thereof. Examples of suitable metal oxides include copper oxide, aluminum oxide, zinc oxide, titanium oxide, iron oxide, and the like, and mixtures thereof. Examples of suitable doped metal oxides include antimony doped tin oxide (such as ZELEC®, which is a trademark of DuPont Chemicals Jackson Laboratories, Deepwater, N.J.), aluminum doped zinc oxide, antimony doped titanium dioxide, similar doped oxides, and mixtures thereof. Examples of suitable polymer fillers include polyimide, polyamide, polyaniline, polytetrafluoroethylene powder, perfluoroalkoxy powder, ethylene chlorotrifluoroethylene, ethylene tetrafluorethylene, polytetrafluoroethylene perfluoromethylvinylether copolymer, fluorinated ethylene propylene powder, and the like, and mixtures thereof.

In embodiments, more than one type of filler may be present in the fluorocarbon outer layer, and/or in any of the other substrate, adhesive or intermediate layer, and/or outer release layer. In embodiments, a carbon filler, metal oxide filler, and/or a polymer filler are present in the fluorocarbon outer layer. In embodiments, a carbon filler is present in an amount of from about 0 to about 20, or from about 0 to about 10 volume percent of total solids. In embodiments, carbon black is the carbon filler. In embodiments, a metal oxide or inorganic/ceramic filler is present in an amount of from about 0 to about 20, or from about 0 to about 10 volume percent of total solids. In embodiments, copper oxide is the metal oxide filler. In embodiments, a polymer filler is present in an amount of from about 0 to about 50 percent, or from about 5 to about 40 volume percent of total solids. In embodiments, barium sulfate is present in the outer layer in an amount of from about 1 to about 15 volume percent, or from about 2 to about 8 volume percent of total solids.

The filler may be present in the fluorocarbon layer in an amount of from about 0 to about 60 percent, or from about 0 to about 40 percent, or from about 0 to about 10 volume percent of total solids. A filler may be present in the substrate in an amount of from about 0 to about 45, or from about 0.01 to about 15, or from about 1 to about 5 volume percent of total solids. In addition, a filler may be present in the outer release layer in an amount of from about 0 to about 55, or from about 10 to about 40, or about 30 volume percent of total solids. Moreover, a filler may be present in the adhesive and/or intermediate layer in an amount of from about 0 to about 40, or from about 0.01 to about 5 volume percent of total solids.

The fusing component member herein may be prepared by preparation of the polyimide or polyamide. The polyimide can be prepared, for example, by using the reaction product of a diamine with a dianhydride dissolved in a solvent such as N-methyl-2-pyrrolidone. An appropriate amount of fluorocarbon is then added and mixed therein. The mixture is pebble milled in a roller mill, attritor or sand mill. The poly(amic acid) and fluorocarbon mixture is cast onto a surface, the solvent removed by evaporation, and heated to convert the poly(amic acid) to polyimide.

The outer fluorocarbon layer can be coated on the substrate using any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, and the like. In an embodiment, the fluorocarbon layer is spray or flow coated to the substrate.

In an embodiment, the outer fluorocarbon layer may be modified by any known technique such as sanding, polishing, grinding, blasting, coating, or the like. In embodiments, the outer fluorocarbon layer has a surface roughness of from about 0.02 to about 1.5 micrometers, or from about 0.3 to about 0.8 micrometers. In the three layer embodiment, wherein an optional release layer is provided on the fluorocarbon outer layer, the outer release layer surface can also be roughened in the same or similar manner as just described.

In an embodiment, the fluorocarbon outer layer (in the two-layer configuration) or the outer release layer (in the three layer configuration) has a gardiner gloss of approximately from about 30 to about 100 ggu in order to achieve less than about 10 ggu, or from about 0.1 to about 5 ggu difference on the first side to the second side of the copy substrate for duplex prints.

Examples of suitable intermediate layers include any material capable of forming a conformable layer, such as those polymers listed as suitable for the outer release layer. Examples of suitable adhesive layers are listed below.

The outer release layer, if present, can comprise a low surface energy material such as silicone rubber, fluoropolymer, urethane, acrylic, titamer, ceramer, hydrofluoroelastomer such as volume grafted fluoroelastomers, or mixtures, copolymers, or polymers thereof.

Examples of suitable fluoropolymers include fluoroelastomers such as copolymers and terpolymers of vinylidenefluoride, hexafluoropropylene and tetrafluoroethylene, which are known commercially under various designations as VITON A®, VITON E®, VITON E60C®, VITON E45®, VITON E430®, VITON 910®, VITON GH®, VITON B50®, and VITON GF®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylene vinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company.

Two specific known fluoroelastomers are (1) a class of copolymers of one or more of, or any combination of vinylidenefluoride, tetrafluoroethylene and hexafluoropropylene known commercially as VITON A® and (2) a class of terpolymers of vinylidenefluoride, hexafluoropropylene, and tetrafluoroethylene known commercially as VITON B®. VITON A®, and VITON B®, and other VITON® designations are trademarks of E.I. DuPont de Nemours and Company.

In another embodiment, the fluoroelastomer is a tetrapolymer having a relatively low quantity of vinylidenefluoride, and comprises vinylidenefluoride, hexafluoropropylene, tetrafluoroethylene and a cure site monomer. An example is VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

In another embodiment of the invention, the fluoroelastomer is a volume grafted elastomer. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator.

Volume graft, in embodiments, refers to a substantially uniform integral interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane. Examples of specific volume graft elastomers are disclosed in U.S. Pat. Nos. 5,166,031; 5,281,506; 5,366,772; and 5,370,931, the disclosures of which are herein incorporated by reference in their entirety.

Other polymers useful as the outer release layer include silicone rubbers such as silicone rubbers, including fluorosilicones, phenyl silicones, silicone blends, and the like. Additional polymers useful as the outer release layer include fluoropolymers such as polytetrafluoroethylene (PTFE), fluorinated ethylenepropylene copolymer (FEP), polyfluoroalkoxy (PFA), perfluoroalkoxy polytetrafluoroethylene (PFA TEFLON®), ethylene chlorotrifluoro ethylene (ECTFE), ethylene tetrafluoroethylene (ETFE), polytetrafluoroethylene perfluoromethylvinylether copolymer (MFA), and the like. These polymers, together with adhesives, can also be included as intermediate layers.

The outer release layer can be coated to the fluorocarbon outer layer using any known, suitable technique. In an embodiment, the outer release layer is spray or flow coated to the fluroocarbon outer layer. The outer release layer can be coated on the outer fluorocarbon layer to a thickness of from about 1 to about 50, or from about 5 to about 30 um.

The static friction as measure against coated paper of the outer layer, over a substrate or over adhesive/intermediate layer may be less than about 0.45, or from about 0.01 to about 0.45, or less than about 0.24 or from about 0.1 to about 0.24. The static friction at these numbers would be enough to eliminate all wave defects.

The fusing component employed for the present invention can be of any suitable configuration. Examples of suitable configurations include a sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like.

Optionally, any known and available suitable adhesive layer may be positioned between the fluorocarbon outer layer and the substrate, and/or between the outer fluorocarbon layer and the outer release layer. Examples of suitable adhesives include silanes such as amino silanes (such as, for example, A1100 from OSI Specialties, Friendly W. Va.), titanates, zirconates, aluminates, and the like, and mixtures thereof. In an embodiment, an adhesive in from about 0.001 to about 10 percent solution, can be wiped on the substrate. The adhesive layer can be coated on the substrate, or on the fluorocarbon outer layer, to a thickness of from about 2 to about 2,000 nanometers, or from about 2 to about 500 nanometers. The adhesive can be coated by any suitable, known technique, including spray coating or wiping.

Specific embodiments of the invention will now be described in detail. These examples are intended to be illustrative, and the invention is not limited to the materials, conditions, or process parameters set forth in these embodiments. All parts are percentages by volume of total solids unless otherwise indicated.

EXAMPLES

Example 1

Polyimide Fuser Member with Perfluoroalkoxy Coating

A polyimide belt can be coated with an outer layer comprising a polyimide and perfluoroalkoxy outer layer. The outer layer may comprise about 1 to about 39 percent by volume of polyamideimide and about 99 to about 61 percent by volume perfluoroalkoxy (XYLAN® 1700). The belt can be run on a Xerox 2060 machine to 100K equivalent 8½×11" sheets. The belt is thought to be durable, and expected not to fail due to toner offset nor stripper finger marks. The belt is also expected to not exhibit any wave defects.

We claim:

1. A fuser member comprising a polyimide substrate, and thereover, an outer layer comprising from about 61 to about 99 volume percent fluorocarbon, and from about 1 to 39 percent by volume of a first filler selected from the group consisting of polyimides and polyamides.

2. The fuser member of claim 1, wherein said fluorocarbon is present in said outer layer in an amount of from about 70 to about 95 percent by volume.

3. The fuser member of claim 2, wherein said fluorocarbon is present in said outer layer in an amount of from about 80 to about 91 percent by volume.

4. The fuser member of claim 1, wherein said fluorocarbon is selected from the group consisting of polytetrafluoroethylene, fluorinated ethylenepropylene copolymer, polyfluoroalkoxy, perfluoroalkoxy polytetrafluoroethylene, ethylene chlorotrifluoro ethylene, ethylene tetrafluoroethylene, polytetrafluoroethylene perfluoromethylvinylether copolymer, polymers thereof, powder fillers thereof, and powder filler mixtures thereof.

5. The fuser member of claim 4, wherein said fluorocarbon is perfluoroalkoxy.

6. The fuser member of claim 1, wherein said first filler is present in said outer layer in an amount of from about 5 to about 30 percent by volume.

7. The fuser member of claim 6, wherein said first filler is present in said outer layer in an amount of from about 9 to about 20 percent by volume.

8. The fuser member of claim 1, wherein said first filler is a polyimide selected from the group consisting of aromatic polyimides, polyamideimide, polyetherimide, siloxane polyetherimide block copolymers, and mixtures thereof.

9. The fuser member of claim 8, wherein said polyimide is a polyamideimide.

10. The fuser member of claim 1, wherein said fluorocarbon outer layer comprises a second filler, wherein said second filler is different than said first filler.

11. The fuser member of claim 10, wherein said second filler is selected from the group consisting of carbon fillers, metal fillers, ceramic fillers, metal oxide fillers, doped metal oxide fillers, polymers fillers, and mixtures thereof.

12. The fuser member of claim 11, wherein said second filler is barium sulfate.

13. The fuser member of claim 1, wherein said substrate comprises a filler.

14. The fuser member of claim 1, further comprising an outer release layer provided on said fluorocarbon outer layer.

15. The fuser member of claim 14, wherein said outer release layer comprises a material selected from the group consisting of fluoropolymers, silicone rubbers, urethanes, acrylics, titamers, creamers, hydrofluoroelastomers, and mixtures thereof.

16. The fuser member of claim 1, wherein an intermediate layer is positioned between said polyimide substrate and said fluorocarbon outer layer.

17. The fuser member of claim 1, wherein said substrate is a pressure belt.

18. A fuser member comprising a polyimide substrate, and thereover, an outer layer comprising from about 1 to about 39 volume percent polyimide and from about 61 to about 99 volume percent perfluoroalkoxy.

19. An image forming apparatus for forming images on a recording medium comprising:

a charge-retentive surface to receive an electrostatic latent image thereon;

a development component to apply toner to said charge-retentive surface to develop an electrostatic latent image to form a developed image on said charge retentive surface;

a transfer film component to transfer the developed image from said charge retentive surface to a copy substrate; and a fuser member and fuser member for fusing toner images to a surface of said copy substrate, wherein said fuser member comprises a polyimide substrate, and thereover, an outer layer comprising from about 61 to about 99 volume percent fluorocarbon, and from about 1 to about 39 percent by volume of a first filler selected from the group consisting of polyimides and polyamides.

* * * * *